(12) United States Patent
Muellner

(10) Patent No.: US 8,629,759 B2
(45) Date of Patent: Jan. 14, 2014

(54) RFID TRANSPONDER WITH PLL

(75) Inventor: Ernst Muellner, Munich (DE)

(73) Assignee: Texas Instruments Deutschland GmBH, Freising (DE)

( * ) Notice: Subject to any disclaimer, the term of this patent is extended or adjusted under 35 U.S.C. 154(b) by 1431 days.

(21) Appl. No.: 12/200,521

(22) Filed: Aug. 28, 2008

(65) Prior Publication Data

US 2009/0174592 A1 Jul. 9, 2009

Related U.S. Application Data

(60) Provisional application No. 61/016,888, filed on Dec. 27, 2007.

(30) Foreign Application Priority Data

Aug. 30, 2007 (DE) .......................... 10 2007 041 154

(51) Int. Cl.
*H04Q 5/22* (2006.01)
(52) U.S. Cl.
USPC .............................. 340/10.1; 455/260; 455/76
(58) Field of Classification Search
USPC ........................................................ 340/10.1
See application file for complete search history.

(56) References Cited

U.S. PATENT DOCUMENTS

| | | | | |
|---|---|---|---|---|
| 5,302,954 A | * | 4/1994 | Brooks et al. | 342/44 |
| 5,488,376 A | * | 1/1996 | Hurta et al. | 342/42 |
| 5,541,604 A | * | 7/1996 | Meier | 342/42 |
| 5,625,327 A | * | 4/1997 | Carroll et al. | 331/74 |
| 5,943,381 A | * | 8/1999 | Zampetti | 375/376 |
| 7,580,493 B2 | * | 8/2009 | Castle | 375/355 |
| 7,973,608 B2 | * | 7/2011 | Kato et al. | 331/17 |
| 2005/0134234 A1 | * | 6/2005 | Kaiser | 320/166 |
| 2006/0267690 A1 | * | 11/2006 | Osada | 331/1 A |
| 2007/0159303 A1 | * | 7/2007 | Tyulpanov | 340/10.4 |

FOREIGN PATENT DOCUMENTS

| | | |
|---|---|---|
| DE | 19752029 A1 | 6/1999 |
| DE | 19752029 B4 | 2/2004 |
| DE | 102005061660 A1 | 6/2007 |
| GB | 2331671 A * | 5/1999 |

* cited by examiner

*Primary Examiner* — George Bugg
*Assistant Examiner* — Anthony D Afrifa-Kyei
(74) *Attorney, Agent, or Firm* — William B. Kempler; Wade J. Brady, III; Frederick J. Telecky, Jr.

(57) ABSTRACT

An RFID transponder comprises an antenna for receiving data in a downlink mode and transmitting data in an uplink mode, with a modulation stage for modulating uplink data and a demodulation stage for demodulating downlink data. A class C amplifier is provided, which has a resonant circuit, a plucking device coupled to the resonant circuit, and a controllable pulse width generator coupled to the plucking device. The controllable pulse width generator is adapted to periodically switch the plucking device on and off so as to maintain an oscillation of the resonant circuit. The transponder further comprises a phase locked loop configured to be locked to an oscillating signal received through the antenna and to be switched into a free running mode without being locked to the oscillating signal received through the antenna, thereby being adapted to output an independent internal clock signal for the RFID transponder.

6 Claims, 1 Drawing Sheet

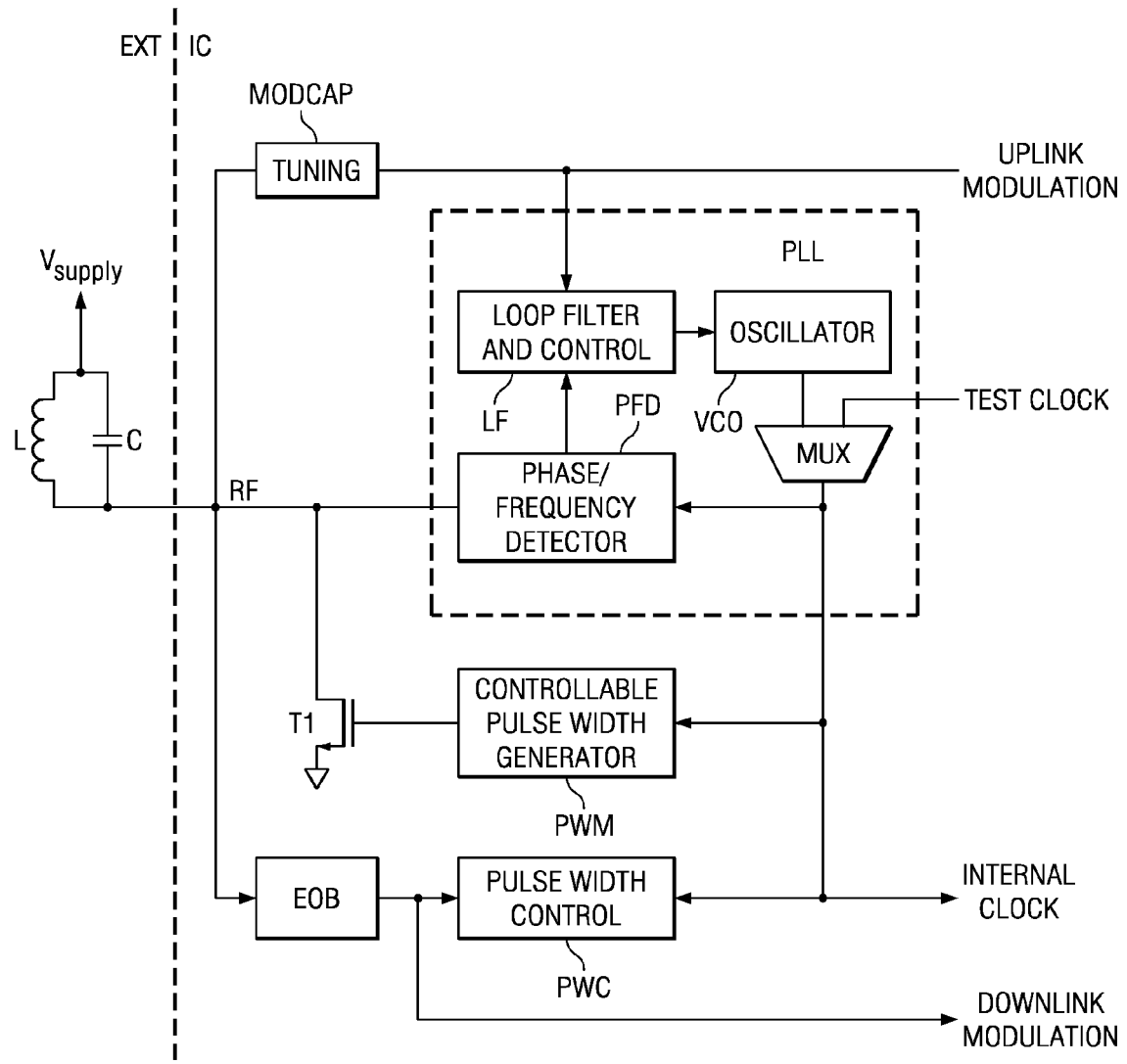

RFID TRANSPONDER WITH PLL

FIELD OF THE INVENTION

The present invention relates to a RFID transponder, and more specifically to a an architecture and corresponding method for operating an RFID transponder.

BACKGROUND OF THE INVENTION

Several different techniques are used in RFID transponders for transmitting data in a downlink mode from a read/write (R/W) unit to the transponder and receiving data in an uplink mode from the transponder at the R/W unit. The present invention relates to a transponder where the uplink signal is, for example, modulated according to an amplitude shift keying (ASK) or frequency shift keying (FSK) principle, and the uplink according to ASK in particular using on-off keying (OON). Using this particular ASK principle, a signal with a specific frequency is transmitted to the transponder and periodically switched on and off. For example, the length of the off periods indicates whether a logic '1' or a logic '0' is transmitted. Therefore, the transponder has to determine the length of an off-period. This can be done with a clock signal generated with an internal crystal oscillator. However, implementing a crystal oscillator in a transponder is rather expensive and therefore not economic for most identification or tagging purposes. Another approach consists of using an LC-oscillator (also LC-tank or resonant circuit). These types of oscillators are cheap. Practically, the inductors and capacitors forming the antenna represent a resonant circuit which is used as an oscillator. The antenna or resonant circuit is then excited by an external RF wave. If the external excitation stops, the oscillation of the antenna (resonant circuit) dies out. This limits the variety of applications. The oscillation can be maintained by use of a resonant circuit, which might use class C amplifiers. Class C amplifiers contain a LC tank or resonant circuit and a plucking device (e.g. a transistor), which is periodically switched on and off for a short time. In this way, the resonant circuit is actively triggered to continue oscillating. This principle is limited in the usable Q range. Q relates to the quality of the resonant circuit which is known as Q or Q factor.

The time during which the oscillation of a resonant circuit can be maintained without plucking (i.e. additional excitation) depends on Q or the Q factor. A low Q indicates that a resonant circuit has high losses and will therefore oscillate for a shorter period of time without excitation than a high Q resonant circuit. However, for broadband transmission, i.e. for high data rates, a low Q oscillator is required. Also, short distance data exchange between the R/W unit and the transponder has an impact on the Q and reduces it. Thus the oscillation of the resonant circuit could hardly be used as a reference to measure the length of excitation pauses. Also, for uplink data transmission, while the R/W unit does not transmit, this oscillation is used as a constant reference clock signal.

It is a general of the present invention to provide a transponder and a method of operating a transponder which allows the transponder to have broader applicability, wider Q range and being less expensive and complex than an internal crystal oscillator.

SUMMARY OF THE DISCLOSURE

This and other features and objects are provided in accordance with an aspect of the present invention to provide an RFID transponder. The RFID transponder comprises an antenna for receiving data in a downlink mode and transmitting data in an uplink mode. A modulation stage is provided for modulating uplink data, as well as a demodulation stage for demodulating downlink data. The transponder also includes a class C amplifier. The class C amplifier comprises an resonant circuit (e.g. a LC tank), a plucking device coupled to the resonant circuit, and a controllable pulse width generator coupled to the plucking device. The controllable pulse width generator is connected to an internal oscillator to periodically switch the plucking device on and off so as to maintain an oscillation of the resonant circuit. The antenna and the resonant circuit can comprise the same L, C components, i.e. parts or all of the antenna can constitute the resonant circuit and vice versa. Practically, the antenna and the resonant circuit can be the same. Further, the transponder also comprises a phase locked loop (PLL) configured to be locked to an RF signal received through the antenna (i.e. the resonant circuit) and to be switched into a free running mode when the PLL is locked to the input RF frequency. The PLL is thereby adapted to output an independent internal clock signal for the RFID transponder. The resonant circuit is excited by an oscillating RF signal received at the antenna and the PLL, which is coupled to the oscillator (e.g. a voltage controlled oscillator), is tuned to the external excitation frequency of the received RF signal. Once locked to the external RF frequency received by the antenna, the PLL generates an output signal which can be used as an internal clock signal for demodulation and for maintaining oscillation in the resonant circuit (i.e. at the antenna) for uplink. In this case the internal clock signal generated by the PLL is input to the controllable pulse width generator so that, based on the internal clock signal, the controllable pulse width generator switches the plucking device, and thus the resonant circuit, on and off with the same frequency as the clock signal. When the plucking device is switched on, power is induced in the resonant circuit, which compensates for any losses in the resonant circuit and thus allows the oscillation to be maintained by using the internal clock signal generated by the PLL. The controllable pulse width generator is used to control the amplitude in the resonant circuit by using, for instance, the demodulation circuit output signal as an indicator for the output amplitude. In this way, oscillation is able to be maintained, and thus the transponder is able to continuously operate, without the need to use an internal crystal oscillator. This reduces the cost of the transponder, and increases the circuit space available.

The modulation stage may comprise means for tuning an oscillating frequency of the resonant circuit (i.e. for example of the antenna) to provide an uplink frequency shift keying (FSK) signal. To improve efficiency for uplink, means for tuning the (e.g. external) resonant circuit approximately to the frequency of the PLL oscillator can be also provided. The tuning means can be implemented, for example, as a simple tunable capacitor chosen according to the uplink modulation signal to shift the resonant frequency of the resonant circuit. In order to provide an uplink ASK signal, the output signal of the PLL may be inverted, so as to produce a signal having a 180° phase shift with respect to the signal from the R/W unit. This attenuates the signal in the resonant circuit and thus serves for backscattering modulation. No additional hardware is required.

The transponder may further comprise an end of burst stage for detecting an end of a burst of downlink data (data received at the antenna from a R/W unit). Upon detection of the end of the burst of downlink data, the end of burst stage can then be used to signal to the phase locked loop that the phase locked loop is to be set into free running mode, which allows the oscillating frequency to be maintained without an external reference. The end of burst stage provides an indication to the phase locked loop that an external oscillating RF signal is no longer being received at the antenna and that it should switch from being locked to the external RF signal to its free running mode. The end of burst stage can be implemented by any suitable circuitry. Further, the end of burst stage can be adapted to detect whether an amplitude of an uplink signal is greater than a predetermined level and to provide a control signal for the class C amplifier to reduce the pulse width of the pulse width modulated signal from the pulse width modulator upon detection that the amplitude of the uplink signal is greater than the predetermined level and vice versa. Thereby, the amplitude of the uplink signal is controlled in response to the EOB signal through the width of the pulse width modulated signal.

A multiplexer can be provided, which is adapted to switch the internal clock signal between the clock signal output by the phase locked loop and a test clock signal externally applied to the transponder. For testing of the oscillator, the phase locked loop is disconnected and an external test clock is applied to the controllable pulse width generator instead of the output of the phase locked loop. This allows simple testing of the oscillator, since during certain tests its output signal must be accessible; i.e., not used to be input to the phase locked loop.

The present invention also provides a method for operating a RFID transponder. The RFID transponder is adapted to receive data in a downlink mode and to transmit data in an uplink mode, the method comprising locking a phase locked loop to an oscillating signal received through an antenna, and switching the phase locked loop into a free running mode without being locked to the oscillating signal received through the antenna, thereby providing an independent internal clock signal for the RFID transponder at an output of the phase locked loop. The received oscillating RF signal is fed to a phase locked loop circuit and is used to lock the phase locked loop, which then outputs the independent internal clock signal. The internal clock signal can then be used to switch the oscillator in such a way that oscillation of the oscillator is maintained and losses are compensated for. The method of the present invention does not require a separate crystal oscillator, which reduces costs and saves space in the RFID transponder circuit. The antenna can be a LC resonant circuit.

BRIEF DESCRIPTION OF THE DRAWINGS

Further advantages and characteristics ensue from the description below of a preferred embodiment, and from the accompanying drawing, in which:

FIG. 1 is a schematic diagram of a transponder according to the invention.

DETAILED DESCRIPTION OF THE INVENTION

FIG. 1 shows a transponder according to the invention in schematic block diagram form. An LC resonant circuit is connected to a supply voltage node Vsupply and has an inductor L connected in parallel with a capacitor C between the supply voltage node Vsupply and a node RF. This is a standard resonant circuit, which in practice also forms the antenna for transmitting and receiving RF signals. Practically, the antenna, i.e. the L and/or C may not be integrated on an integrated electronic device according to the present invention, but they can rather be externally implemented. However, either a separate or an integrated antenna or any other resonant circuit configurations may also be used without departing from the invention. The dashed line indicates a possible portioning of internal (IC) and external (EXT) components, which may not be integrated on the same integrated electronic device. A plucking device, which is implemented here as an NMOS transistor T1, is connected between the node RF and ground by its drain and source terminals, respectively, with the gate terminal of the transistor T1 being connected to a controllable pulse width generator (pulse width modulator) PWM. The oscillator formed of the inductor L and the capacitor C, as well as the transistor T1 and the pulse width modulator PWM together form a class C amplifier. The node RF at the output of the resonant circuit is also connected to the input of a phase locked loop circuit PLL, which may be either an analog or a digital phase locked loop. The phase locked loop PLL is, for example, comprised of the standard phase locked loop components of a phase/frequency detector PFD at the input, a loop filter and control circuit LF, and a voltage controlled oscillator VCO for providing the output. The voltage controlled oscillator is the clock source or timing source for the transponder, with the frequency of the VCO being controlled by the loop filter and control circuitry LF. Tuning circuitry MODCAP, which can be a tuning capacitor, is connected to the resonant circuit via the node RF and also to an uplink modulation stage for shifting the resonant frequency of the oscillator for FSK according to the uplink modulation signal. The output of the phase locked loop PLL, is connected to the controllable pulse width generator PWM and to pulse width control circuitry PWC. An end of burst detector EOB is provided between the node RF and the pulse width control circuitry PWC and is also connected to a downlink modulation stage.

At the start of communication with the transponder, a charge pulse derived from an external RF signal received at the antenna, which may, for example, last for about 50 ms, is used to synchronize the phase locked loop PLL. The transponder becomes active, the phase locked loop PLL starts and the voltage controlled oscillator VCO is tuned to the oscillating frequency of the external RF signal received at the antenna (i.e. e.g. the resonant circuit LC). After tuning of the VCO has taken place, and/or when the external RF signal is absent, the phase locked loop PLL can be "frozen" into a free running mode, in which the VCO stops tuning to the external RF signal but continues oscillating so that the VCO basically remains in the last state it was in before the PLL entered the free running mode. The external RF signal received through the antenna can not be used as a reference clock during uplink transmission and also during off-periods in the downlink stage. However, even without external reference the PLL can be adapted to output and maintain an oscillating signal, which can be used to maintain the oscillation of the resonant circuit (antenna) consisting of the inductor L and the capacitor C. If an analog PLL is used, the PLL can be switched into a free running mode by switching off the internal charge pump in the loop filter and control circuitry LF. Alternatively, if a digital PLL is used, the input signals to the VCO (which would be replaced by a digital controlled oscillator or DCO) can be fixed for as long as necessary when the PLL is in free running mode. Practically, the frequency of the VCO or DCO will drift slightly, for example due to temperature changes or other influences, but this drift may be neglected as long as the time that the external RF signal is absent is sufficiently short.

During downlink transmission, amplitude shift keying (ASK), in particular on-off keying (OON) is used. Downlink modulation of the received RF signal at the downlink modulation stage is detected by the end of burst detector EOB. If for example the EOB signal changes to logic low, i.e. the external signal from the R/W unit is suspended, the length of an off period is decoded using the PLL output signal (i.e. the VCO clock signal) in free running mode as the time reference. In free running mode, practically, the PLL output signal can be used for any purpose as a sufficiently stable reference, whenever an external reference signal is not available.

During uplink, and if frequency shift keying (FSK) is used for uplink, the frequency of the external resonant circuitry is tuned or switched between two frequencies and the PLL is tuned accordingly while in its free running state to correspond to the nominal resonant frequency of the tuned resonant circuit LC. This allows the tuned LC resonant circuit to be optimally plucked (excited through T1) with minimum power losses. The clock signal output from the PLL is then fed to the controllable pulse width generator PWM and causes the PWM to output a signal to the gate of the plucking transistor T1 with the same timing as the PLL output signal so that the timing for plucking the resonant circuit is optimal. Generally, when the signal supplied to the gate terminal of the transistor T1 is high, the transistor T1 is opened and provides a short circuit to the inductor L of the oscillator. This causes a larger current to flow through L thereby inducing energy in the LC tank (resonant circuit). This additional energy compensates for the losses in the resonant circuit that occur. Tuning the PLL to the uplink frequency means that the output signal of the PLL, and thus the plucking of the resonant circuit by the transistor T1, is synchronous with the oscillating frequency of the LC resonant circuit. This is the most power-efficient way of plucking the resonant circuit, however, the PLL oscillating frequency can also be different from the nominal frequency of the LC resonant circuit if it is required to tune the LC resonant circuit away from its nominal resonant frequency.

If ASK is used for uplink modulation, the output signal of the PLL may be inverted so as to provide a clock signal that has a 180° phase shift with respect to the signal received from the R/W unit and to which the PLL is locked. This inverted signal may then be attenuated according to ASK modulation to be used for uplink data transmission. This attenuates the signal in the resonant circuit and thus serves as backscattering modulation, with no additional hardware required.

Although the present invention has been described with reference to a specific embodiment, it is not limited to this embodiment and no doubt further alternatives will occur to the skilled person that lie within the scope of the invention as claimed.

The invention claimed is:

1. An RFID transponder, comprising:
an antenna for receiving data in a downlink mode and transmitting data in an uplink mode;
a modulation stage for modulating uplink data and a demodulation stage for demodulating downlink data; and
a class C amplifier comprising a resonant circuit (L, C), a plucking device (T1) coupled to the resonant circuit, and a controllable pulse width generator (PWM) coupled to the plucking device (T1), the controllable pulse width generator (PWM) being adapted to periodically switch the plucking device (T1) on and off so as to maintain an oscillation of the resonant circuit (L, C), wherein the transponder further comprises a phase locked loop (PLL) configured to be locked to an oscillating signal received through the antenna and to be switched into a free running mode without being locked to the oscillating signal received through the antenna, thereby being adapted to output an internal clock signal for the RFID transponder, which is independent from the oscillating signal received through the antenna; an end of burst stage (EOB) for detecting an end of a burst of downlink data and being adapted to signal to the phase locked loop (PLL), upon detection of the end of the burst of downlink data, that the phase locked loop (PLL) is to be set into free running mode, so as to maintain the oscillating frequency without an external reference, wherein the end of burst stage (EOB) is further adapted to detect whether an amplitude of an uplink signal is greater than a predetermined level and to provide a control signal for the class C amplifier to reduce the pulse width of the pulse width modulated signal from the pulse width modulator (PWM) upon detection that the amplitude of the uplink signal is greater than said predetermined level.

2. The RFID transponder according to claim 1, wherein the modulation stage comprises means (MODCAP) for tuning an oscillating frequency of the resonant circuit (L, C) to provide an uplink FSK signal, the RFID transponder being adapted to change an oscillating frequency of the phase locked loop (PLL) in accordance with a change of the oscillating frequency of the resonant circuit (L, C).

3. The RFID transponder according to claim 1, further comprising a multiplexer (MUX) adapted to switch the internal clock signal between the clock signal output by the phase locked loop (PLL) and a test clock signal externally applied to the transponder.

4. The RFID transponder according to claim 2, further comprising a multiplexer (MUX) adapted to switch the internal clock signal between the clock signal output by the phase locked loop (PLL) and a test clock signal externally applied to the transponder.

5. A method for operating a RFID transponder, which is adapted to receive data in a downlink mode and to transmit data in an uplink mode, the method comprising:
locking a phase locked loop (PLL) to an oscillating signal received through an antenna; and
switching the phase locked loop (PLL) into a free running mode without being locked to the oscillating signal received through the antenna thereby providing an internal clock signal for the RFID transponder at an output of the phase locked loop (PLL), which is independent from the oscillating signal received through the antenna; and
detecting in an end of burst stage (EOB) an end of a burst of downlink data and signalling to the phase locked loop (PLL), upon detection of the end of the burst of downlink data, that the phase locked loop (PLL) is to be set into free running mode, so as to maintain the oscillating frequency without an external reference, wherein the end of burst stage (EOB) detects whether an amplitude of an uplink signal is greater than a predetermined level and to provide a control signal for the class C amplifier to reduce the pulse width of the pulse width modulated signal from the pulse width modulator (PWM) upon detection that the amplitude of the uplink signal is greater than said predetermined level.

6. In an RFID transponder, having an antenna for receiving data in a downlink mode and transmitting data in an uplink mode and a modulation stage for modulating uplink data and a demodulation stage for demodulating downlink data; an oscillator comprising:
a class C amplifier comprising a resonant circuit (L, C), a plucking device (T1) coupled to the resonant circuit, and a controllable pulse width generator (PWM) coupled to the plucking device (T1), the controllable pulse width generator (PWM) being adapted to periodically switch the plucking device (T1) on and off so as to maintain an oscillation of the resonant circuit (L, C); and an end of burst stage (EOB) for detecting an end of a burst of downlink data and being adapted to signal to the phase locked loop (PLL), upon detection of the end of the burst of downlink data, that the phase locked loop (PLL) is to be set into free running mode, so as to maintain the oscillating frequency without an external reference, wherein the end of burst stage (EOB) is further adapted to detect whether an amplitude of an uplink signal is greater than a predetermined level and to provide a control signal for the class C amplifier to reduce the pulse width of the pulse width modulated signal from the pulse width modulator (PWM) upon detection that the amplitude of the uplink signal is greater than said predetermined level.

* * * * *